United States Patent
Rizzuto et al.

(10) Patent No.: US 7,808,925 B2
(45) Date of Patent: Oct. 5, 2010

(54) METHODS AND SYSTEMS FOR DETERMINING REVERSE DNS ENTRIES

(75) Inventors: Joseph J. Rizzuto, Norcross, GA (US); Jeffrey Burdette, Norcross, GA (US); John Nystrom, Alpharetta, GA (US)

(73) Assignee: Digital Envoy, Inc., Norcross, GA (US)

( * ) Notice: Subject to any disclaimer, the term of this patent is extended or adjusted under 35 U.S.C. 154(b) by 1000 days.

(21) Appl. No.: 10/938,750

(22) Filed: Sep. 10, 2004

(65) Prior Publication Data

US 2006/0056418 A1    Mar. 16, 2006

(51) Int. Cl.
*H04L 12/28* (2006.01)
*H04L 12/56* (2006.01)

(52) U.S. Cl. ........................................ 370/254; 709/224

(58) Field of Classification Search ............ 370/395.31, 370/395.32, 395.52, 395.54
See application file for complete search history.

(56) References Cited

U.S. PATENT DOCUMENTS

| | | | |
|---|---|---|---|
| 4,939,726 A | 7/1990 | Flammer et al. | |
| 5,042,032 A | 8/1991 | Dighe et al. | |
| 5,115,433 A | 5/1992 | Baran et al. | |
| 5,488,608 A | 1/1996 | Flammer et al. | |
| 5,490,252 A | 2/1996 | Macera et al. | |
| 5,802,053 A * | 9/1998 | Bollella et al. ............... | 370/401 |
| 5,862,339 A | 1/1999 | Bonnaure et al. | |
| 5,878,126 A | 3/1999 | Velamuri et al. | |
| 5,948,061 A | 9/1999 | Merriman et al. | |
| 6,012,088 A | 1/2000 | Li et al. | |
| 6,035,332 A | 3/2000 | Ingrassia, Jr. et al. | |
| 6,115,545 A | 9/2000 | Mellquist ................. | 395/200.5 |
| 6,130,890 A | 10/2000 | Leinwand et al. | |
| 6,151,631 A | 11/2000 | Ansell et al. | |
| 6,185,598 B1 | 2/2001 | Farber et al. | |
| 6,275,470 B1 | 8/2001 | Ricciuli | |
| 6,338,082 B1 | 1/2002 | Schneider | |
| 6,421,726 B1 | 7/2002 | Kenner et al. | |
| 6,425,000 B1 | 7/2002 | Carmello et al. | |
| 6,434,144 B1 * | 8/2002 | Romanov ............... | 370/395.32 |

(Continued)

FOREIGN PATENT DOCUMENTS

JP          3254422          2/2002

(Continued)

OTHER PUBLICATIONS

U.S. Appl. No. 60/194,761, filed Apr. 3, 2000, Christopher Herringshaw, et al., Inventor.

(Continued)

*Primary Examiner*—Gregory B Sefcheck
*Assistant Examiner*—Joshua Smith
(74) *Attorney, Agent, or Firm*—Ballard Spahr LLP

(57) ABSTRACT

Systems and methods that determine reverse DNS entries for IP addresses are described. In one embodiment, a first group of consecutive IP addresses is identified, a first configured IP address in the first group is determined, wherein the first configured IP address has an associated first domain name, a first non-configured IP address in the first group is determined, and the first domain name is associated with a set of IP addresses from the first configured IP address to the first non-configured IP address.

9 Claims, 2 Drawing Sheets

U.S. PATENT DOCUMENTS

| | | | |
|---|---|---|---|
| 6,442,602 B1* | 8/2002 | Choudhry | 370/252 |
| 6,526,450 B1 | 2/2003 | Zhang et al. | |
| 6,564,216 B2 | 5/2003 | Waters | 707/10 |
| 6,577,628 B1* | 6/2003 | Hejza | 370/392 |
| 6,728,232 B2 | 4/2004 | Hasty, Jr. et al. | 370/338 |
| 6,813,645 B1* | 11/2004 | Meyer | 370/392 |
| 7,003,555 B1 | 2/2006 | Jungck | 370/475 |
| 7,197,549 B1* | 3/2007 | Salama et al. | 709/223 |
| 7,317,693 B1* | 1/2008 | Roesch et al. | 370/252 |
| 7,366,182 B2* | 4/2008 | O'Neill | 370/395.53 |
| 2002/0010735 A1* | 1/2002 | McMillen et al. | 370/254 |
| 2002/0069272 A1* | 6/2002 | Kim et al. | 709/221 |
| 2003/0053441 A1* | 3/2003 | Banerjee | 370/356 |
| 2003/0145073 A1 | 7/2003 | Lee | 709/223 |
| 2003/0177236 A1* | 9/2003 | Goto et al. | 709/225 |
| 2004/0148439 A1* | 7/2004 | Harvey et al. | 709/249 |
| 2004/0261116 A1* | 12/2004 | Mckeown et al. | 725/109 |
| 2005/0013255 A1* | 1/2005 | Knop et al. | 370/254 |
| 2005/0030945 A1* | 2/2005 | Sarikaya et al. | 370/338 |
| 2005/0076144 A1* | 4/2005 | Boylan et al. | 709/245 |
| 2006/0031382 A1* | 2/2006 | Pradhakar et al. | 709/217 |
| 2006/0031385 A1* | 2/2006 | Westerdal | 709/217 |
| 2006/0034297 A1* | 2/2006 | O'Neill | 370/254 |

FOREIGN PATENT DOCUMENTS

| | | |
|---|---|---|
| WO | WO 99/34305 | 7/1999 |

OTHER PUBLICATIONS

U.S. Appl. No. 60/241,776, filed Oct. 18, 2000, Brad Doctor, et al., Inventor.

*Content Delivery Services: Footprint Streaming Solutions*, Brochure from Digital Island, 2002.

*TraceWire White Paper*, Brochure from Digital Island, Jun. 1999.

*We Know Where You Live*, Scott Woolley, Forbes Magazine, Nov. 13, 2000.

*Nicname/Whois*, Internet Engineering Task Force, Request for Comments 954, Oct. 1985.

*A Primer on Internet and TCT/IP Tools and Utilities*, Internet Engineering Task Force, Request for Comments 2151, Jun. 1997.

*Domain Name System Security Extensions*, Internet Engineering Task Force, Request for Comments 2535, Mar. 1999.

* cited by examiner

METHODS AND SYSTEMS FOR DETERMINING REVERSE DNS ENTRIES

FIELD OF THE INVENTION

The present invention generally relates to domain names. More particularly, the present invention relates to methods and systems for determining reverse DNS entries.

BACKGROUND

The Internet consists of a network of interconnected computer networks. Each of these computers has an IP address that is comprised of a series of four numbers separated by periods or dots and each of these four numbers is an 8-bit integer which collectively represent the unique address of the computer within the Internet. The Internet is a packet switching network whereby a data file routed over the Internet to some destination is broken down into a number of packets that are separately transmitted to the destination. Each packet contains, inter alia, some portion of the data file and the IP address of the destination.

The IP address of a destination is useful in routing packets to the correct destination but is not very people friendly. A group of four 8-bit numbers by themselves do not reveal or suggest anything about the destination and most people would find it difficult to remember the IP addresses of a destination. As a result of this shortcoming in just using IP addresses, domain names were created. Domain names consist of two or more parts, frequently words, separated by periods. Since the words, numbers, or other symbols forming a domain name often indicate or at least suggest the identity of a destination, domain names have become the standard way of entering an address and are more easily remembered than the IP addresses. After a domain name has been entered, a domain name server (DNS) resolves the domain name into a specific IP address. Thus, for example, when someone surfing the Internet enters into a browser program a particular domain name for a web site, the browser first queries the DNS to arrive at the proper IP address.

IP addresses are typically assigned to the computer networks of the Internet or autonomous systems ("ASs"). An autonomous system is a collection of IP addresses and IP-capable devices and communications links under a single administrative domain. An autonomous system assigned the IP addresses can include one or more organizations, universities or companies, such as Internet Service Providers ("ISPs"). A particular AS may be assigned a range of IP addresses and each host within an AS can be assigned an IP address. For example, a single AS may have the IP addresses 128.66.64.0 through 128.66.64.255, with each IP address corresponding to a host. In order to ensure that information is routed to the correct destination, each AS must be able to determine how to reach the AS that is assigned the destination address. Therefore, each AS can announce its range to other ASs on the Internet. Other ASs can use this information to ensure that the data packet reaches the AS assigned the destination address and, therefore, the destination.

The use of reverse DNS has been problematic for several reasons (determining a domain name from an IP address), including reverse DNS is not required for the Internet to work properly (unlike forward DNS) and there are no restrictions on reverse DNS naming. Because reverse DNS is not required for the Internet to work properly, owners of IP address blocks or groups do not always provide reverse DNS entries for their IP addresses except in cases where it helps in the maintenance of the owners' networks. The routers on the Internet backbone are generally configured with good, consistent reverse DNS entries. However, moving away from the Internet backbone, many organizations, such as ISPs, do not configure reverse DNS entries for the hosts away from the Internet backbone.

Additionally, an ISP can provide any domain name for a reverse DNS entry, because there are no restrictions on reverse DNS naming. An ISP can, for example, use an domain name for a host corresponding to an IP address in its address space even if the ISP does not own the domain name or even if the domain name is not allocated. An ISP can also use a top level domain for a host corresponding to an IP address in its address space even though the top level domain does not exist.

SUMMARY

Embodiments of the present invention comprise methods and systems for determining reverse DNS entries. In one embodiment, a first group of consecutive IP addresses is identified. A first configured IP address in the first group is determined. The first configured IP address has an associated first domain name. A first non-configured IP address in the first group is determined, and the first domain name is associated with a set of IP addresses from the first configured IP address to the first non-configured IP address. In a further embodiment, a second group of consecutive IP addresses is determined. The second group is in a determined route with the first group. The first domain name is associated with all or a plurality of IP addresses in the second group.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF DRAWINGS

The accompanying drawings, which are incorporated in and form a part of the specification, illustrate preferred embodiments of the present invention and, together with the description, disclose the principles of the invention. In the drawings.

DETAILED DESCRIPTION

Figure 1:
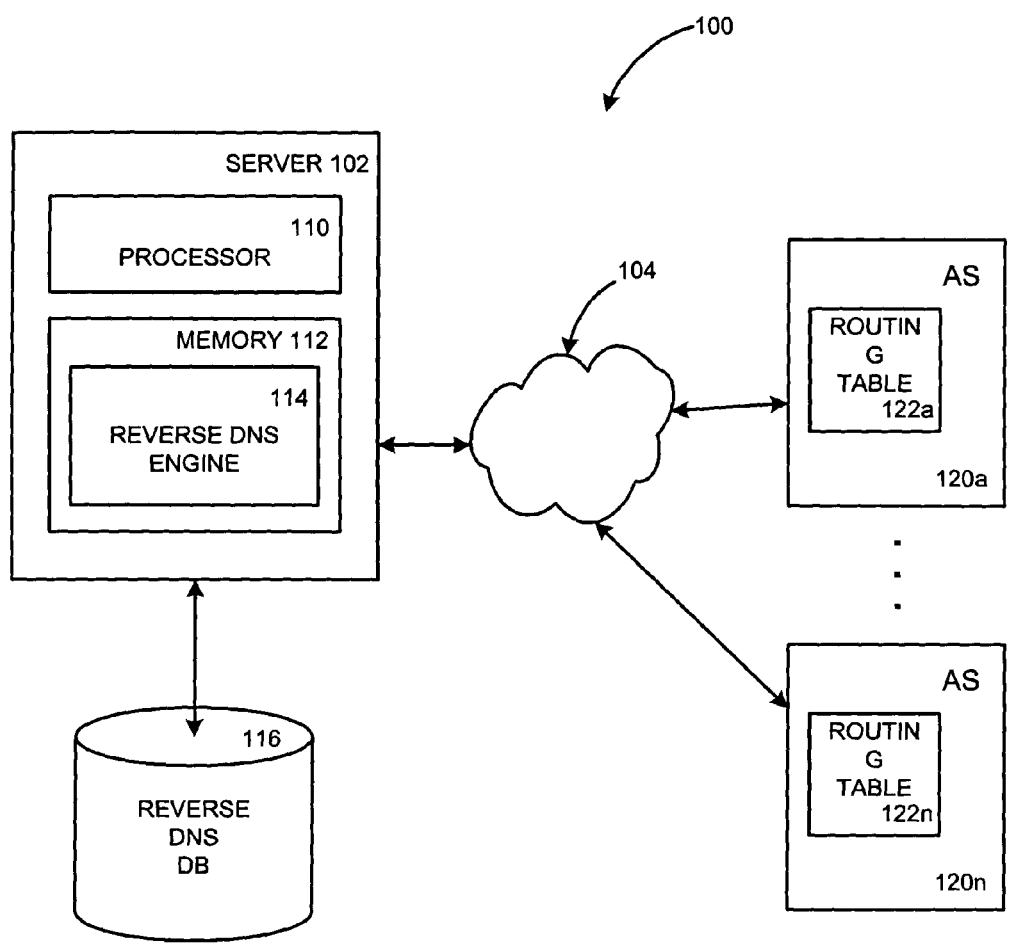
FIG. 1 is a diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. The system 100 shown in FIG. 1 includes a server device 102 in communication with autonomous systems 120a-120n through a network 104. The network 104 shown comprises the Internet.

The Internet 104 can comprise and can be connected with autonomous systems 120a-120n. An autonomous system (AS) is a collection of IP addresses, IP-capable devices, and communications links under a single administrative domain. A particular AS may be assigned a group of consecutive IP addresses and each host within an AS can be assigned an IP address. For example, a single AS may have the IP addresses 128.66.64.0 through 128.66.64.255, each IP address corresponding to a host. In one embodiment, the AS 120a is a /24 network and can have 254 hosts, each with a corresponding IP address.

In order to ensure that information is routed to the correct destination, each AS can contain a routing table 122a-122n containing routing information between ASs on the Internet. The routing tables can indicate which router and AS is responsible for a group of IP addresses. The ASs 120a-120n can use the Border Gateway Protocol (BGP), an exterior gateway protocol, to share routing information so that efficient, loop-free routes can be established.

The server device 102 shown in FIG. 1 includes a server executing a reverse DNS engine application program, or reverse DNS engine. The server device 102 includes a processor 110 coupled to a computer-readable memory 112. The processor 110 executes computer-executable program instructions stored in memory 112. Such processors may include a microprocessor, an ASIC, and state machines. The processor 110 can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of server 102, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Server device 102, depicted as a single computer system, may be implemented as a network of computer processors. Examples of a server device 102 are servers, mainframe computers, networked computers, a processor-based device, and similar types of systems and devices. In another embodiment, the server device 102 is a client device. Examples of client devices are personal computers, digital assistants, personal digital assistants, cellular phones, mobile phones, smart phones, pagers, digital tablets, laptop computers, Internet appliances, and other processor-based devices.

Memory 112 contains the reverse DNS engine application program, also known as a reverse DNS engine 114. The reverse DNS engine 114 determines the domain names for identified groups of IP addresses. The reverse DNS engine 114 can identify a group of IP consecutive addresses, such as a /24 group, with unknown reverse DNS entries from an AS routing table, such as from a matching BGP routing announcement. In one embodiment, the reverse DNS engine 114 determines non-configured reverse DNS entries for IP addresses within the group by using configured reverse DNS entries within the same route. A configured entry for an IP address contains a domain name associated with the IP address. The reverse DNS engine 114 can use a configured reverse DNS entry within a group, such as a /24 group, and propagate the associated domain name to fill entries for non-configured IP addresses in the /24 group. The reverse DNS engine 114 can continue filling in entries for non-configured IP addresses for surrounding /24 groups up to the route boundaries. For /24 groups with no configured reverse DNS entries, the reverse DNS engine 114 can fill these non-configured entries from surrounding /24 groups that reside in the same BGP published route.

Server device 102 also provides access to other storage elements, such as a reverse DNS storage element, in the example shown a reverse DNS database 116. The reverse DNS database 116 can be used to store configured reverse DNS entries. Data storage elements may include any one or combination of methods for storing data, including without limitation, arrays, hash tables, lists, and pairs. Other similar types of data storage devices can be accessed by the server device 102.

It should be noted that the present invention may comprise systems having different architecture than that which is shown in FIG. 1. For example, in some systems according to the present invention, server device 102 may comprise a single physical or logical server. The system 100 shown in FIG. 1 is merely exemplary, and is used to explain the exemplary method shown in FIG. 2.

Figure 2:
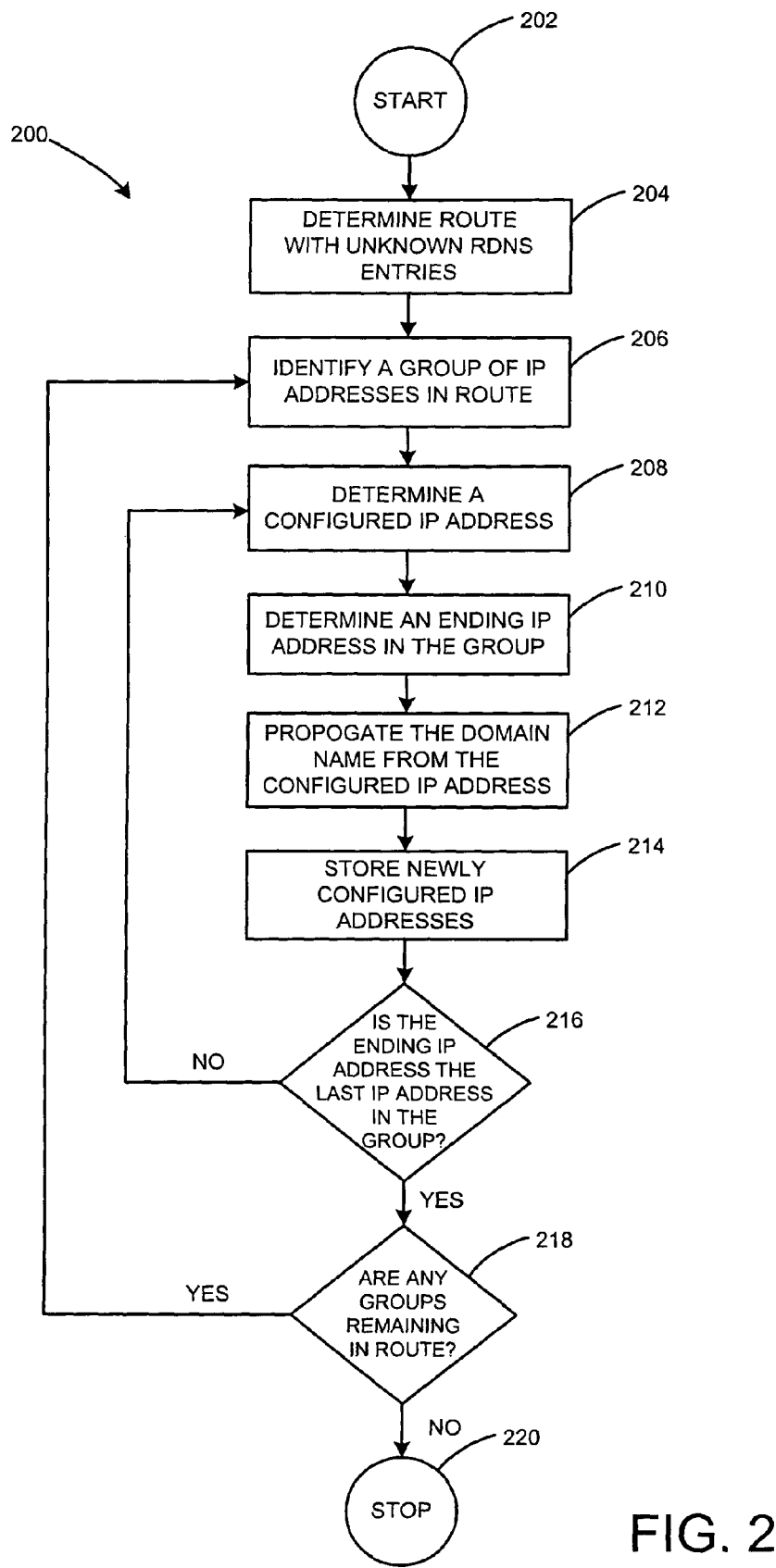
FIG. 2 is a flow diagram illustrating a method of determining reverse DNS entries for IP addresses in one embodiment of the present invention.

FIG. 2 illustrates an exemplary method 200 and provides a method for determining reverse DNS entries. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the method 200 begins. In 204, the reverse DNS engine 114 determines a route containing unknown or non-configured reverse DNS entries. The reverse DNS engine 114 can determine this route through a BGP routing announcement from an AS routing table, such as routing table 122a in AS 120a. The route can contain a plurality of groups of IP addresses. In one embodiment, each group is a /24 group.

In 206, a group of consecutive IP addresses in the route is identified by the reverse DNS engine 114. The reverse DNS engine 114 can identify a group based on the number of configured IP addresses in the group. A configured IP address can be an IP address with a corresponding reverse DNS entry containing an associated domain name. A non-configured IP address can be an IP address with no corresponding reverse DNS entry or a corresponding reverse DNS entry containing no associated domain name or an incorrect associated domain name.

In 208, the reverse DNS engine 114 determines a configured IP address to use for the group identified in 206. If the identified group contains one or more configured IP addresses then the reverse DNS engine 114 can determine and use the configured entry corresponding to the IP address closest to the beginning of the group (or the lowest IP address). If the identified group does not contain a configured IP address, then the reverse DNS engine 114 can determine a configured IP address from a surrounding group in the route.

In 210, the reverse DNS engine 114 determines an ending IP address in the group. The ending IP address can be the last IP address in the group or can be a non-configured IP address before a subsequent configured IP address. In one embodiment, the subsequent configured IP address has an associated domain name different from the configured IP address determined in 208.

In 212, the reverse DNS engine 114 propagates the domain name associated with the configured IP address determined in 208 to a set of IP addresses in the identified group. If the configured IP address identified in 208 is in the identified group, then the domain name is propagated to a set of IP addresses in the identified group between the configured IP address and the ending IP address. If the configured IP address is not at the beginning of the group, then all addresses from the beginning of an AS group block up to the configured IP address are identified with the entry for the configured IP address.

In a first example, the identified group has IP addresses 128.66.64.0-128.66.64.255 and the configured IP address is 128.66.64.0 and has the associated domain name "me.com". In this first example, the IP address 128.66.64.128 is configured and has a different associated domain name, "you.com". The ending IP address for this example is, thus, 128.66.64.127. The domain name, me.com, is associated with each IP address in the set of IP addresses from 128.66.64.1-128.66.64.127. If the configured IP address is not in the identified group, then the domain name is propagated to a set of IP address in the identified group between a beginning IP address and the ending IP address. In a second example, the identified group has IP addresses 128.66.64.0-128.66.64.255 and contains no configured IP address. The beginning address is, thus, 126.66.64.0, the ending IP address is, thus, 128.66.64.255 and the set of IP addresses is the entire group of IP addresses. In this second example, the identified configured IP address from an adjacent group in the route has the associated domain name "me.com". This domain name, me.com, is associated with each IP address in the group—128.66.64.0-128.66.64.255.

In a third example for 128.66.64.6, if "us.com" is the first and only entry in the AS group 128.66.64.0-128.66.128.255, then all addresses 128.66.64.0-128.66.128.255 will be filled with "us.com" based on the AS group routing.

In 214, the reverse DNS engine 114 stores the newly configured IP addresses from 212 in the reverse DNS database 116.

In 216, the reverse DNS engine 114 determines if the ending IP address was the last IP address (or highest number IP address) in the identified group. If the reverse DNS engine 114 determines that the ending IP address was not the last IP address in the group, the reverse DNS engine 114 determines a new configured IP address in block 208 and the method 200 continues. In the first example above, where the ending IP address is 128.66.64.127, the reverse DNS engine 114 returns to block 208 and determines the new configured IP address, 128.66.64.128, and its associated domain name, you.com.

If the ending IP address was the last IP address in the group, then the reverse DNS engine 114 determines in 218 whether there are any groups remaining in the route with non-configured IP addresses remaining in the route. If the reverse DNS engine 114 determines that there are groups remaining with non-configured IP addresses in the route, then the reverse DNS engine 114 identifies a new group of IP addresses in the route and returns to block 206 and the method 200 continues. A new group is determined by walking through the routeable space sequentially. If the reverse DNS engine 114 determines that there are no groups in the route with non-configured reverse DNS entries, then method 200 stops at 220.

The embodiments were chosen and described in order to explain the principles of the invention and their practical application so as to enable others skilled in the art to utilize the invention and various embodiments and with various modifications as are suited to the particular use contemplated. The terms first and second are used herein merely to differentiate one IP address, group, or domain name from another IP address, group, or domain name. The terms first and second are not used to indicate first or second in time, or first or second in a list, or other order, unless explicitly noted. For example, the "second" may come in time or in a list before the "first," unless it is otherwise explicitly indicated.

What is claimed:

1. A method for determining reverse DNS entries for IP addresses, comprising:
    identifying, by a server, a first group of consecutive IP addresses, respective IP addresses in the first group of consecutive IP addresses having a reverse DNS entry associated therewith;
    determining a first configured IP address in the first group, wherein the reverse DNS entry associated with the first configured IP address contains an associated first domain name;
    determining a second configured IP address following the first configured IP address in the first group, wherein the reverse DNS entry associated with the second configured IP address contains an associated second domain name, said second domain name different than the first domain name;
    determining an ending IP address in the first group, said ending IP address comprising a non-configured IP address immediately preceding the second configured IP address, wherein the reverse DNS entry associated with the non-configured IP address does not contain a domain name; and
    filling, with the first domain name, the reverse DNS entry associated with each of one or more consecutive IP addresses of the first group of consecutive IP addresses beginning with an IP address immediately after the first configured IP address and ending with and including the ending IP address.

2. The method of claim 1, further comprising:
    identifying a second group of consecutive IP addresses in a determined route with the first group, respective IP addresses in the second group of consecutive IP addresses having a reverse DNS entry associated therewith; and
    filling, with the first domain name, the reverse DNS entry associated with all or a plurality of IP addresses in the second group.

3. The method of claim 2, wherein the first group and second group of /24 groups.

4. The method of claim 2, wherein the route is determined from an autonomous system routing table.

5. A non-transitory computer-readable medium containing program code for determining reverse DNS entries for IP addresses, comprising:
    program code for identifying a first group of consecutive IP addresses, respective IP addresses in the first group of consecutive IP addresses having a reverse DNS entry associated therewith;
    program code for determining a first configured IP address in the first group, wherein the reverse DNS entry associated with the first configured IP address has contains an associated first domain name;
    program code for determining a second configured IP address following the first configured IP address in the first group, wherein the reverse DNS entry associated with the second configured IP address contains an associated second domain name, said second domain name different than the first domain name;
    program code for determining an ending IP address in the first group, said ending IP address comprising a non-configured IP address immediately preceding the second configured IP address, wherein the reverse DNS entry associated with the non-configured IP address does not contain a domain name; and program code for filling, with the first domain name, the reverse DNS entry associated with each of one or more consecutive IP addresses of the first group of consecutive IP addresses beginning with an IP address immediately after the first configured IP address and ending with and including the ending IP address.

6. The computer-readable medium of claim 5, further comprising:

program code for identifying a second group of consecutive IP addresses in a determined route with the first group, respective IP addresses in the second group of consecutive IP addresses having a reverse DNS entry associated therewith; and program code for filling, with the first domain name, the reverse DNS entry associated with all or a plurality of IP addresses in the second group.

7. The computer-readable medium of claim 6, wherein the first group and second group of /24 groups.

8. The computer-readable medium of claim 6, wherein the route is determined from an autonomous system routing table.

9. A method for determining reverse DNS entries for IP addresses, comprising:

determining a route from an autonomous system routing table;

identifying, by a server, a first group of consecutive IP addresses in the route, respective IP addresses in the first group of consecutive IP addresses having a reverse DNS entry associated therewith;

determining a first configured IP address in the first group, wherein the reverse DNS entry associated with the first configured IP address contains an associated first domain name;

determining an ending IP address in the first group, said ending IP address comprising one of the last IP address in the first group of consecutive IP addresses or a non-configured IP address immediately preceding a second configured IP address, wherein the second configured IP address follows the first configured IP address, the reverse DNS entry associated with the second configured IP address contains an associated second domain name different than the first domain name, and the reverse DNS entry associated with the non-configured IP address does not contain a domain name; and filling, with the first domain name, the reverse DNS entry of each of one or more consecutive IP addresses of the first group of consecutive IP addresses beginning with an IP address immediately after the first configured IP address and ending with and including the ending IP address.

* * * * *